United States Patent
O'Brien et al.

(10) Patent No.: US 7,129,889 B1
(45) Date of Patent: Oct. 31, 2006

(54) USER SEGMENT-BASED LEVER ARM CORRECTION VIA PRESCRIBED MANEUVER FOR HIGH-ACCURACY NAVIGATION

(75) Inventors: Kevin M. O'Brien, Los Alamitos, CA (US); Jonathan A. Tekawy, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/247,493

(22) Filed: Oct. 10, 2005

(51) Int. Cl.
*H04B 7/185* (2006.01)
(52) U.S. Cl. .................. 342/358; 342/354; 342/357.02
(58) Field of Classification Search ........ 342/354–355, 342/357.02, 358–359
See application file for complete search history.

(56) References Cited

U.S. PATENT DOCUMENTS 5,928,309 A * 7/1999 Korver et al. .............. 342/359

OTHER PUBLICATIONS

P.W. Ward et al., Satellite Signal Acquisition, Tracking, and Data Demodulation, Chapter 5 in Understanding GPS: Principles and Applications, Second Edition, ed E. Kaplan et al., Artech House, p. 153, 164, 2005.*

B.C. Barker et al., Overview of the GPS M Code Signal, Proceedings of the Institute of Navigation, Jan. 2000.*

Defense Science Board Task Force on The Future of the Global Positioning System, http://www.acq.osd.mil/dsb/reports/2005-10-GPS_Report_Final.pdf, Oct. 2005.*

K. Kovach, New User Equivalent Range Error (UERE) Budget for the Modernized Navstar Global Positioning System (GPS), Proceedings of The Institute of Navigation National Technical Meeting, Jan. 2000.*

Keith D. McDonald. The Modernization of GPS: Plans, New Capabilites and the Future Relationship to Galileo, Jul. 18, 2002, vol. 1, No. 1:1-17.

* cited by examiner

*Primary Examiner*—Thomas H. Tarcza
*Assistant Examiner*—Fred H Mull
(74) *Attorney, Agent, or Firm*—Gates & Cooper LLP

(57) ABSTRACT

A method and apparatus for computing a lever arm correction between a wide beam coverage antenna and a steerable spot beam antenna of a navigational satellite is disclosed. A navigation receiver computes the lever arm correction using information from the navigational satellite that allows both the position of the navigational satellite and the navigational receiver to be determined using a known geometry of the steerable spot beam antenna and a prescribed satellite attitude maneuver profile.

20 Claims, 14 Drawing Sheets

USER SEGMENT-BASED LEVER ARM CORRECTION VIA PRESCRIBED MANEUVER FOR HIGH-ACCURACY NAVIGATION

CROSS REFERENCE TO RELATED APPLICATIONS

This application is related to the following co-pending and commonly assigned patent application(s), all of which applications are incorporated by reference herein:

Application Ser. No. 11/247,641, entitled "SPACE-BASED LEVER ARM CORRECTION IN NAVIGATIONAL SYSTEMS EMPLOYING SPOT BEAMS," by Jonathan A. Tekawy and Kevin M. O'Brien, and filed on same date herewith; and Application Ser. No. 11/247,640, entitled "CONTROL SEGMENT BASED LEVER-ARM CORRECTION VIA CURVE FITTING FOR HIGH ACCURACY NAVIGATION," by Jonathan A. Tekawy and Kevin M. O'Brien and filed on same date herewith.

BACKGROUND OF THE INVENTION

1. Field of the Invention

The present invention relates generally to space-based navigational systems, and in particular, to user segment-based lever arm correction systems applicable to navigational systems employing spot beams.

2. Description of the Related Art

The Global Positioning System (GPS) is a satellite system that transmits navigation signals that are received by ground-based GPS receivers and used to determine the position of the GPS receiver to a high degree of accuracy. GPS currently provides standard service to commercial receivers, and a higher accuracy service to military receivers authorized to receive such signals.

In current systems, the GPS navigation signal is transmitted via a wide beam satellite antenna disposed on each GPS satellite. The wide beam antenna permits any GPS receiver having a line-of-sight to the GPS satellite to receive the navigational signal, and when the navigation signal from a sufficient number of GPS satellites has been acquired, the GPS receiver can determine its position via a precision clock and well-known triangulation techniques.

Because GPS signals are also used in military applications, countermeasures can be expected to be applied in an attempt to reduce the effectiveness of the GPS system. One such countermeasure is jamming. To increase the effectiveness of the GPS signals in a jamming environment, a steerable high gain antenna may be used to transmit high intensity GPS signals via spot beams to areas where needed.

One difficulty with this approach is that the high gain spot beam antenna is typically physically displaced from the wide beam antenna, and consequently, the phase center of each antenna is also displaced as well. This displacement is known as the "lever arm" between the antennas, and left uncorrected, can negatively affect the ability of the GPS receivers to determine their position. Without any correction, the lever arm between the wide beam antenna and a 7 meter diameter spot beam antenna can contribute up to 4.4 meters of user range error (IRE). Depending on the GPS satellite constellation, this uncompensated URE can produce up to nine meters (RMS) of vertical (altitude) navigation error, which is a factor of 10 higher than the performance of the current GPS constellation of 0.9 meters (RMS). In civil aviation applications, such errors are sufficient to result in loss of life, and in military applications, they can result in increased collateral damage, and increased sortie and weapon consumption to perform the same mission.

Further exacerbating this problem is the fact that in order to maintain proper Sun and Earth pointing, the GPS satellites are required to perform attitude maneuvers. Such maneuvers can be very large, particularly about the yaw axis.

To achieve such high-accuracy navigation demanded for many missions, the GPS system must provide users with real-time corrections of the spot beam antenna phase center location relative to the Earth coverage antenna phase center, even while the spot beam antenna is moving to track specific terrestrial locations.

What is needed is an apparatus and method for computing a correction for lever arm related errors, and for incorporating this correction in navigation computations. The present invention satisfies these needs.

SUMMARY OF THE INVENTION

To address the requirements described above, the present invention discloses a method and apparatus for estimating a lever arm correction between a wide beam antenna and a spot beam antenna of a navigational satellite The method comprises the steps of receiving information describing a location of the phase center of the wide coverage antenna of the navigational satellite in a navigational receiver, determining the location of the navigational receiver; and generating the lever arm correction from the location of the phase center of the wide coverage antenna of the at least one navigational satellite, the determined location of the navigational receiver, information describing the geometry of a steerable spot beam antenna, and a profile of a prescribed satellite attitude maneuver. In one embodiment, the apparatus is embodied by a navigation receiver, comprising a receiver module, a locating module communicatively coupled to the receiver module, and a lever arm correction module. The receiver module receives a first navigational signal and a second navigational signal augmenting the first navigational signal from at least one of a system of navigational satellites, the first navigational signal transmitted from a wide coverage antenna, and the second navigational signal transmitted from a steerable spot beam antenna, and both signals having information describing a location of a phase center of the wide coverage antenna. The locating module determines the location of the navigational receiver at least in part from the first navigational signal, and the lever arm correction module for generating a lever arm correction from the information describing the location of the phase center of the wide coverage antenna, the determined location of the navigational receiver, information describing the geometry of the steerable spot beam antenna, and information describing a prescribed satellite attitude maneuver.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1A:
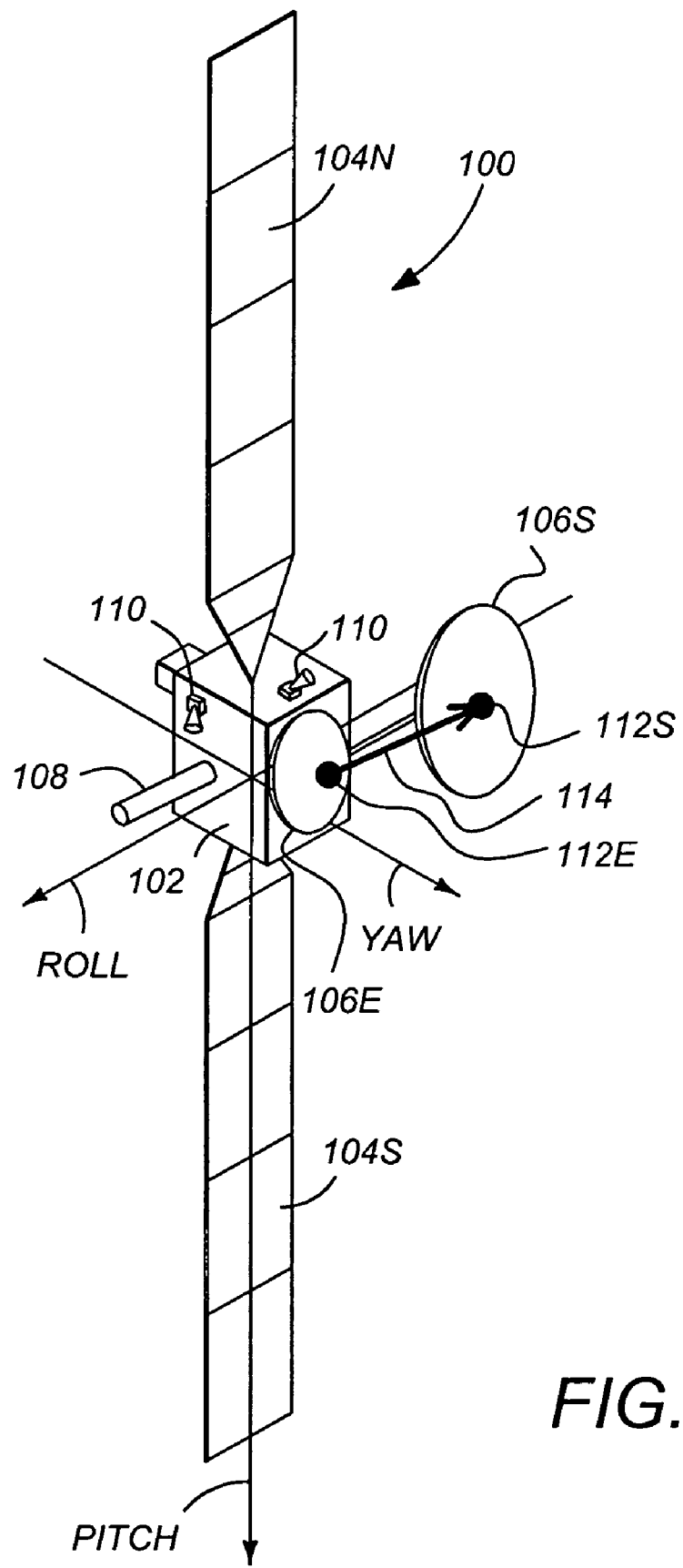
FIG. 1A is an illustration of a three-axis stabilized satellite.

FIG. 1A illustrates a three-axis stabilized satellite or spacecraft 100. The satellite 100 has a main body 102 (which may be referred to as the "satellite bus"), one or more solar panels 104, one or more navigation beam antennas 106E and 106S, and a telemetry and command antenna 108 which is used to communicate with a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1A are referred to by the numerals 104N and 104S for the "North" and "South" solar panels, respectively.

The three axes of the spacecraft 100 are shown in FIG. 1A. The pitch axis lies along the line of the solar panels' 104N and 104S mutual rotation axes. The roll and yaw axes are perpendicular to the pitch axis and lie in the directions and planes shown.

In the illustrated embodiment, the satellite 100 includes a first navigation beam antenna 106E and a second navigation beam antenna 106S. The first navigation beam antenna 106E is a wide-beam antenna which transmits a navigation signal with a beamwidth covering the widest range of the Earth's surface possible from that satellite's altitude at any time, and is directed toward the Earth along the yaw axis. Since this antenna 106E offers the widest coverage of the Earth's surface, it is typically not steerable. The navigation system uses a constellation of such satellites 100 to provide coverage any where on the Earth's surface by at least 4 different satellites at all times, thus permitting the navigational signal transmitted by the satellites to be used to determine the location and clock bias of the receiver using triangulation techniques.

The second navigation beam antenna 106S is a steerable spot beam antenna that provides a second navigation signal in a much narrower navigation beam. This allows transmission of a higher-strength beam to selected points on the ground without requiring excessive transmitter power, thus reducing the effectiveness of countermeasures such as jamming. Since the required service area includes substantially the entire surface of the Earth and the beamwidth of the spot beam antenna 106S is not wide enough to cover the entire surface area, the boresight of the spot beam antenna 106S can be steered about to direct the spot beam where desired. Such steering can be accomplished mechanically, by use of a gimbal structure driven by gimbal motors, or electronically, using phased arrays, for example.

FIG. 1A also shows the phase center 112E of the wide beam antenna 106E and the phase center 112S of the spot beam antenna 106S. Since the spot beam antenna 106S is offset from the wide beam antenna 106E, the phase centers 112S, 112E of the antennas are separated by an antenna lever arm 114, which is represented as a vector originating at the phase center 112E of the wide beam antenna 106E and extending to the phase center 112S of the spot beam antenna 106S. Due to motion of the satellite bus 102 and the spot beam antenna 106S and other factors, the antenna lever arm 114 does not remain fixed, but can vary substantially over time. This variance is enough to add a significant uncertainty in the ability of a navigation receiver (such as a GPS receiver) to determine its location when a navigation signal is received via the spot beam.

Figure 1B:
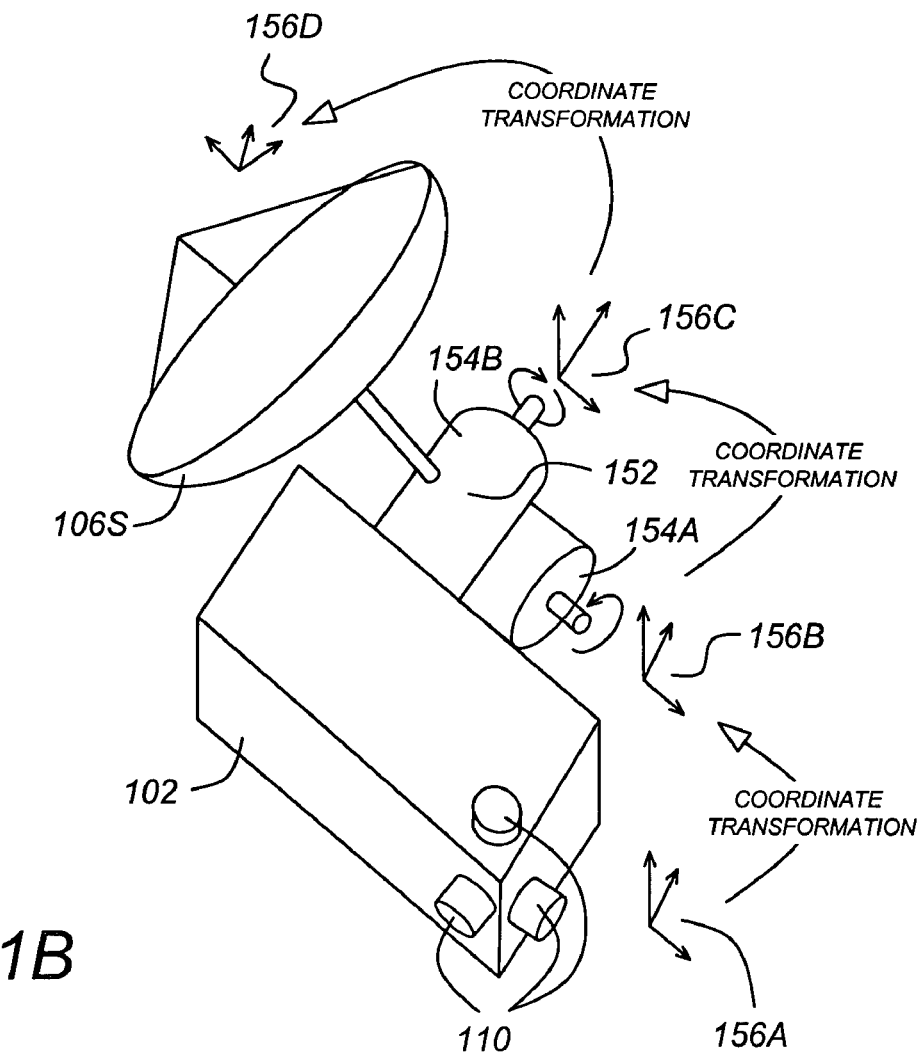
FIG. 1B is an illustration of an embodiment of a gimbal assembly.

The spot beam antenna 106S may be steered electronically (by appropriate phasing of elements in a scanning array) or mechanically (by use of a non-scanning antenna and a gimbal assembly), or a combination of both. FIG. 1B illustrates an embodiment using a gimbal assembly 152 having an inner gimbal 154A and an outer gimbal 154B. The inner gimbal 154A is associated with inner gimbal coordinate frame 156B while the outer gimbal 154B is associated with an outer gimbal coordinate frame 156C. Driven by gimbal motors or other devices (not illustrated), the inner and outer gimbals 154A, 154B angularly direct the antenna 106S boresight (which is represented in antenna signal boresight coordinate frame 156D) where desired to transmit the navigation signal spot beam using the antenna 106S. Both inner and outer gimbals 154 typically include a potentiometer or other means to measure the gimbal angle.

To determine the angle at which the inner and outer gimbals 154 should be positioned to direct the spot beam antenna 106S to the desired scan locations (to perform a specific mission profile), the spacecraft 100 determines its attitude via the attitude sensors 110, which may be mounted on the satellite bus or body 102. Using the measured satellite attitude and the angular and translational displacement between the satellite body 102 and the spot beam antenna 106S (as expressed by coordinate systems 156A–156D), the satellite 100 can determine the appropriate gimbal angles, and commands the gimbal motors to move the gimbals 154 to the appropriate positions.

Figure 2:
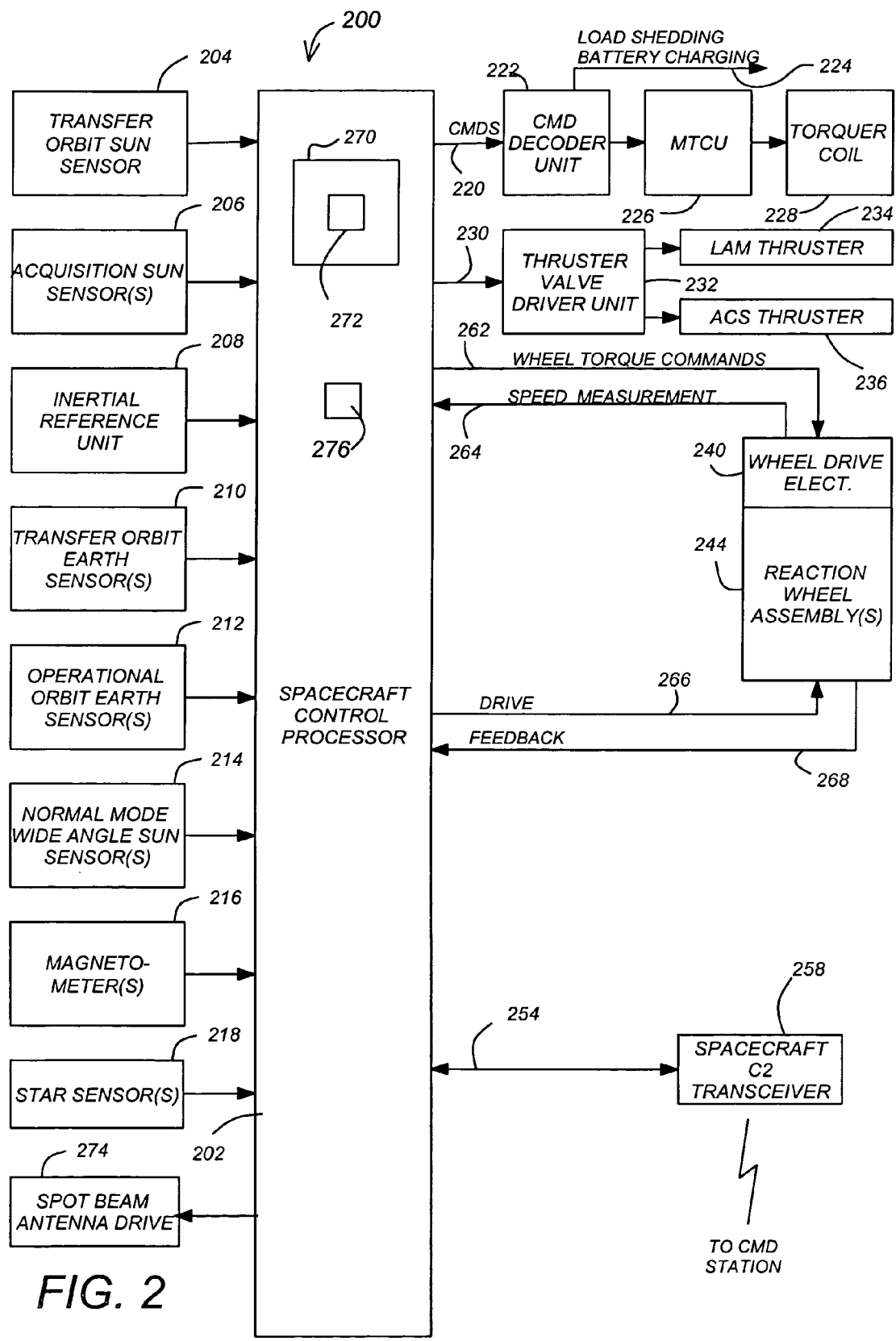
FIG. 2 is a diagram depicting a functional architecture of a representative satellite attitude control system.

FIG. 2 is a diagram depicting the functional architecture of a representative attitude control system 200. Control of the spacecraft is provided by a computer or spacecraft control processor (SCP) 202. The SCP 202 performs a number of functions which may include post ejection sequencing, transfer orbit processing, acquisition control, station-keeping control, normal mode control, mechanisms control, fault protection, and spacecraft systems support, among others.

The SCP 202 may implement one or more processing modules such as antenna control module 276, which is used to control the satellite spot beam antenna drive 274 to slew the spot beam antenna 106S to the appropriate orientation and to transmit a navigation signal. Alternatively, the antenna control module 276 can be implemented in a different processor or in dedicated circuitry.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

Wheel torque commands 262 are generated by the SCP 202 and are communicated to the wheel drive electronics 240 which command the speed of the reaction wheels in reaction wheel assembly(s) 244. Typically, the spacecraft 100 includes four reaction wheels, at least one in each orthogonal direction, and one for redundancy purposes. The speed of the reaction wheels is also measured and fed back to the SCP 202 by feedback control signal 264. The SCP 202 also communicates commands and data 254 with command stations (further described in connection with FIG. 7) via a satellite transmitter/receiver (or transceiver) 258.

The foregoing describes an exemplary space stabilized satellite attitude control system. The present invention can be implemented with other attitude control system designs as well.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, cause the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

As described above, it is desirable to correct for navigation errors caused by the lever arm 114 between the wide beam antenna and the steerable spot beam antenna. One approach taken to correct for such errors is to compute the antenna lever arm 114 in the satellite coordinate frame, and transmit this information to the GPS receivers in the navigational message. The GPS receiver then uses this information to compute corrections in the GPS (e.g. Earth Centered Earth Fixed) coordinate frame. However, this technique is complicated by the maneuvers that the satellite 100 must undergo to direct the solar panels 104 at the Sun and the wide beam antenna 106E at the Earth. Depending on the Sun angle, this requires a rather substantial yaw maneuver twice per orbit (at orbit noon and midnight).

Figure 3:
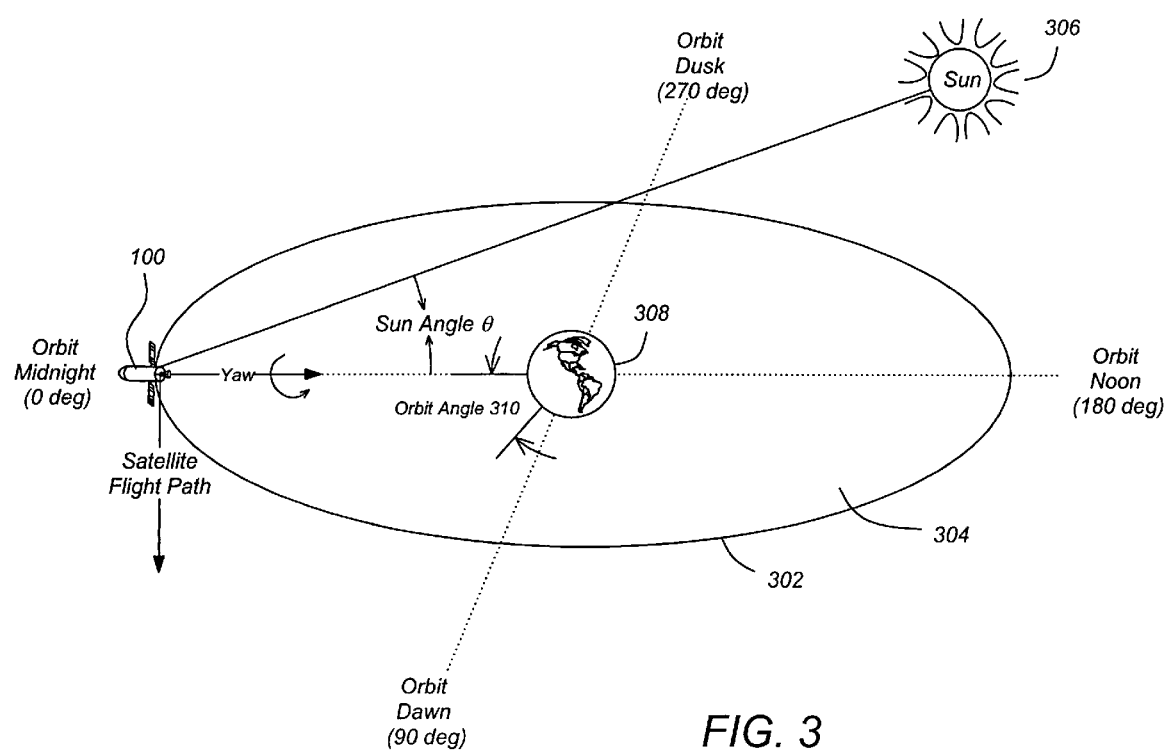
FIG. 3 is a diagram depicting geometrical relationships between the satellite, the Earth and the Sun.

FIG. 3 is a diagram depicting the geometrical relationships between the satellite 100, the Earth 308 and the Sun 306. Each satellite 100 of the GPS system is in an orbit 302 around the Earth 308, thus defining an orbital plane 304. The angle θ between the orbital plane 304 and the Sun 306 is the Sun angle. The satellite 100 orbits the Earth 308, always directing the antenna 106E at the Earth 308. The satellite 100 attitude and solar panels 104 are adjusted to keep the solar panels 104 directed at the Sun 306 and the antenna 106E directed at the Earth 308 at the same time. Typically, this requires the satellite 100 to perform a large rotation about the yaw axis at the orbital midnight (0 degree orbit angle) and the orbital noon (180 degree orbit angle). The smaller the Sun angle θ, the larger the required rotation about the yaw axis.

Figure 4A:
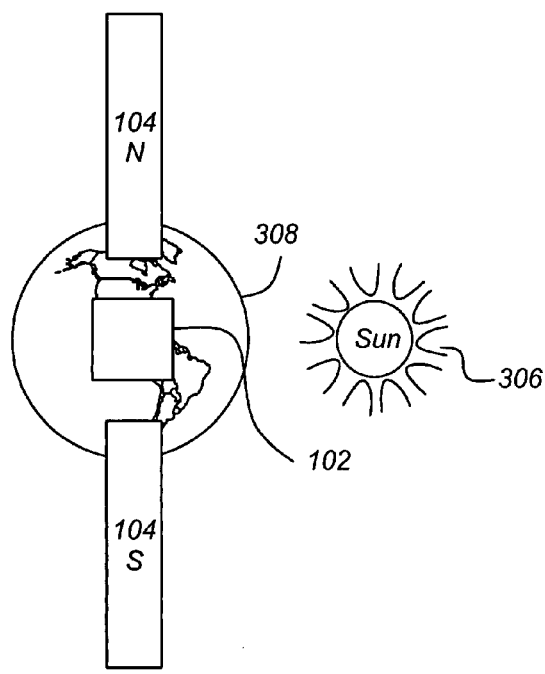
FIGS. 4A–4E are diagrams depicting the yaw noon maneuver at orbital midnight for a zero Sun angle.
Figure 4B:
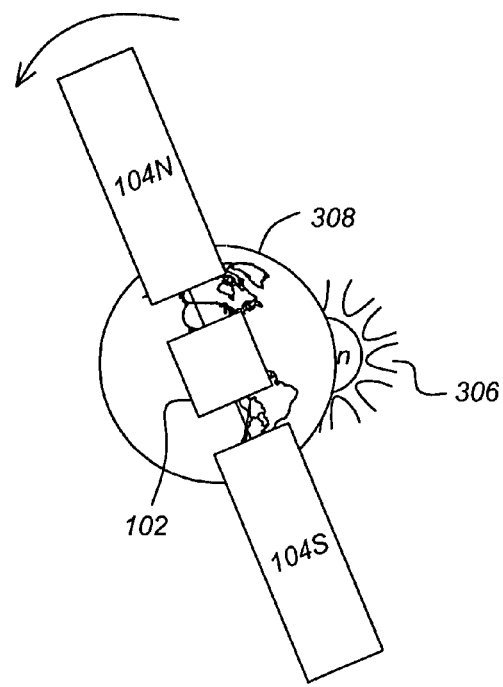
Figure 4C:
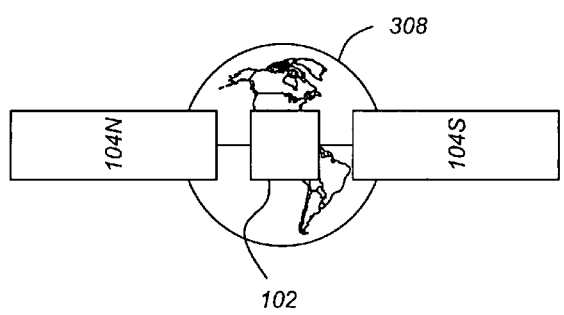
Figure 4D:
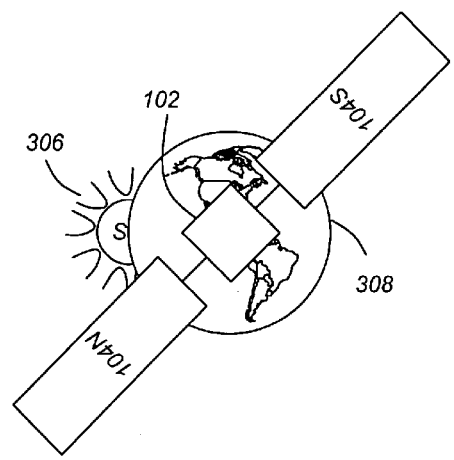
Figure 4E:
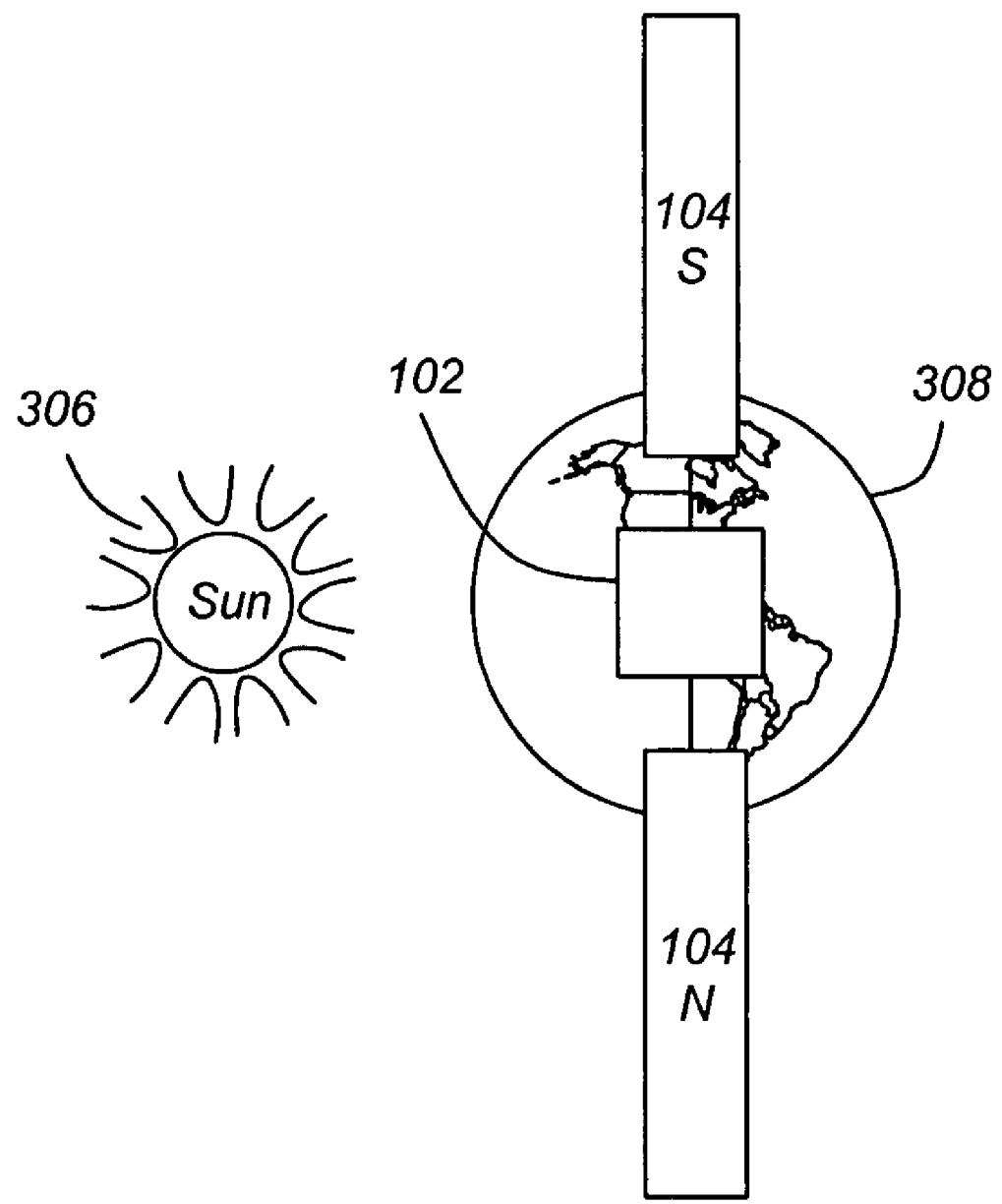

FIGS. 4A–4E are diagrams depicting the yaw turn maneuver at orbital midnight for a zero Sun angle (wherein the Sun 306 is in the orbital plane 304). FIG. 4A illustrates the satellite 100 attitude and solar panel 104 orientation as the orbital midnight is approached. Note that the solar panels 104 are canted at an angle to direct them to be perpendicular to the Sun's rays. Shortly before the Sun 306 approaches eclipse by the Earth 308, the satellite 100 begins its maneuver and yaws counter clockwise as shown in FIG. 4B through FIG. 4D. When the Sun 306 fully emerges from the eclipse, the satellite 100 has yawed 180 degrees from its initial position. A similar maneuver occurs when the satellite passes directly between the Earth and Sun, also called noon.

Figure 5:
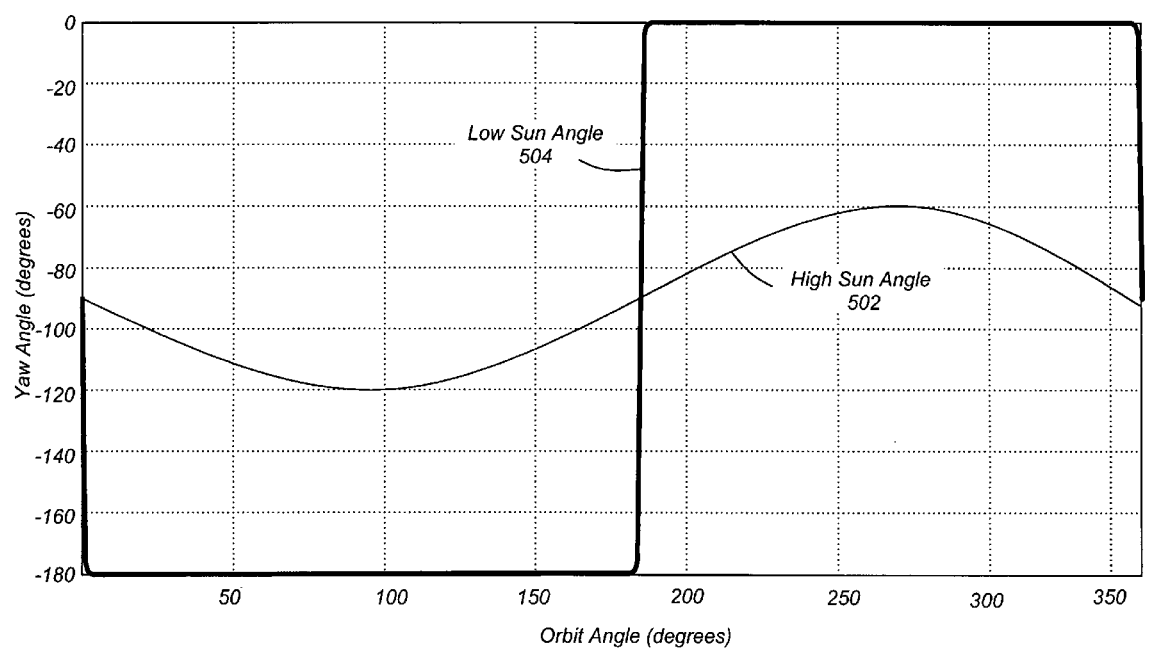
FIG. 5 is a diagram depicting the yaw attitude angle as a function of the orbit angle and the Sun angle.

FIG. 5 is a diagram plotting the ideal yaw angle as a function of the orbit angle. At higher Sun 306 angles, the yaw angle movement is gradual, as shown in trace 502. However, at low Sun 306 angles θ (e.g., angles less than about 5 degrees) the yaw angle abruptly transitions 180 degrees at orbital angles of 0 and 180 degrees, with resulting high yaw angular rates and/or accelerations, as shown in trace 504. Such low Sun angle θ conditions occur over a significant portion of the year. For the GPS satellite system, the satellites are distributed in orbits such that at least four satellites will always experience eclipses during their orbits.

Figure 6:
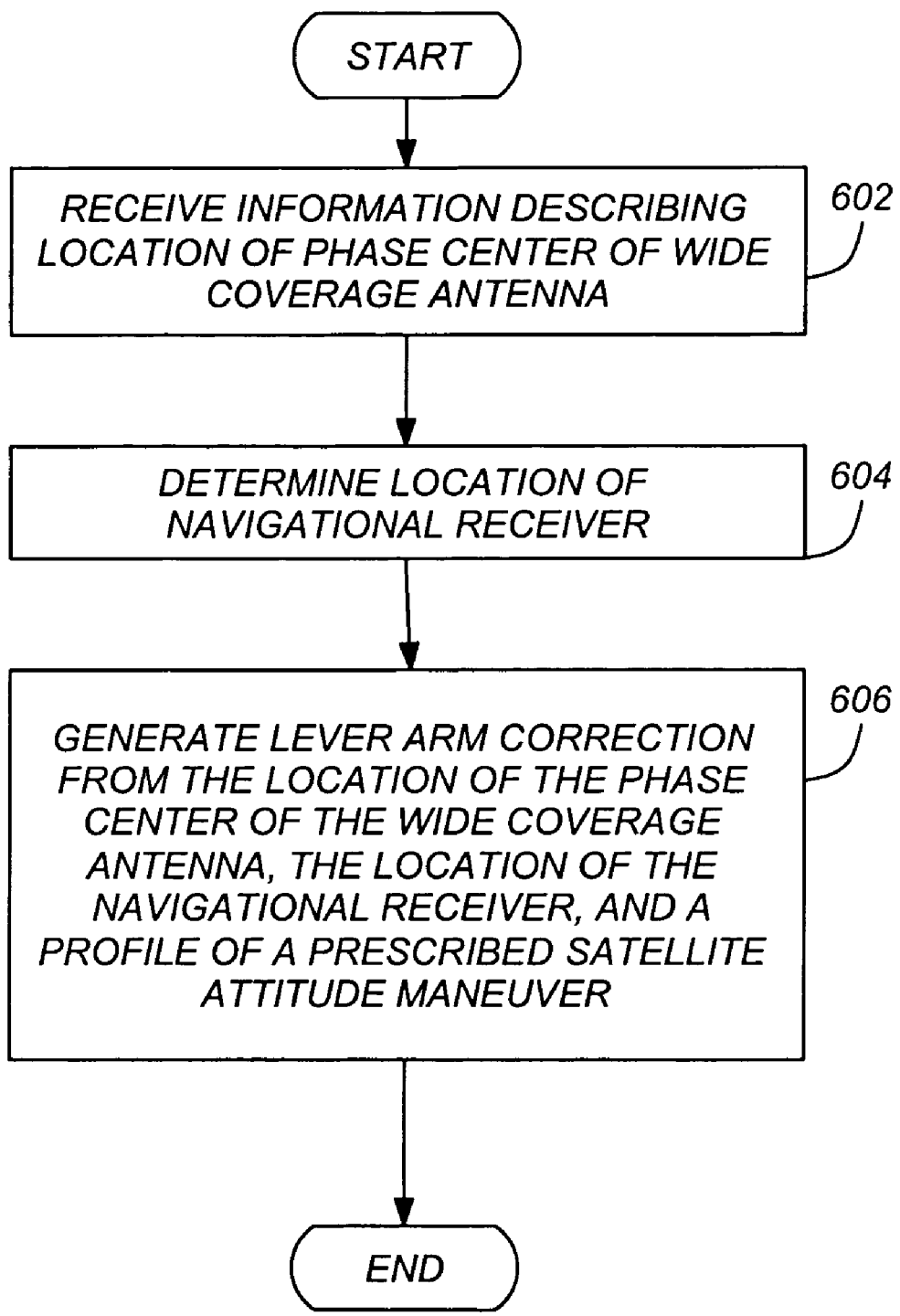
FIG. 6 is a diagram illustrating an exemplary embodiment of a technique for estimating the lever arm correction between the wide coverage antenna and the spot beam antenna.

FIG. 6 is a diagram illustrating an exemplary embodiment of a technique for estimating the lever arm 114 correction between the wide coverage antenna 106E and the spot beam antenna 106S. Block 602 depicts receiving information describing the location of the phase center 112E of the wide coverage antenna 106E. In block 604, the location of the navigational receiver is determined. Then, in block 606, a lever arm 114 correction between the location of the phase center of the wide coverage antenna 112E and the phase center of the spot beam antenna 112S is generated. This is accomplished using the location of the navigational receiver, the phase center of the wide overage antenna 112E, information about the geometry of the spot beam antenna steering system, and a profile (e.g. information describing) of a prescribed satellite attitude maneuver, as described further below.

Figure 7:
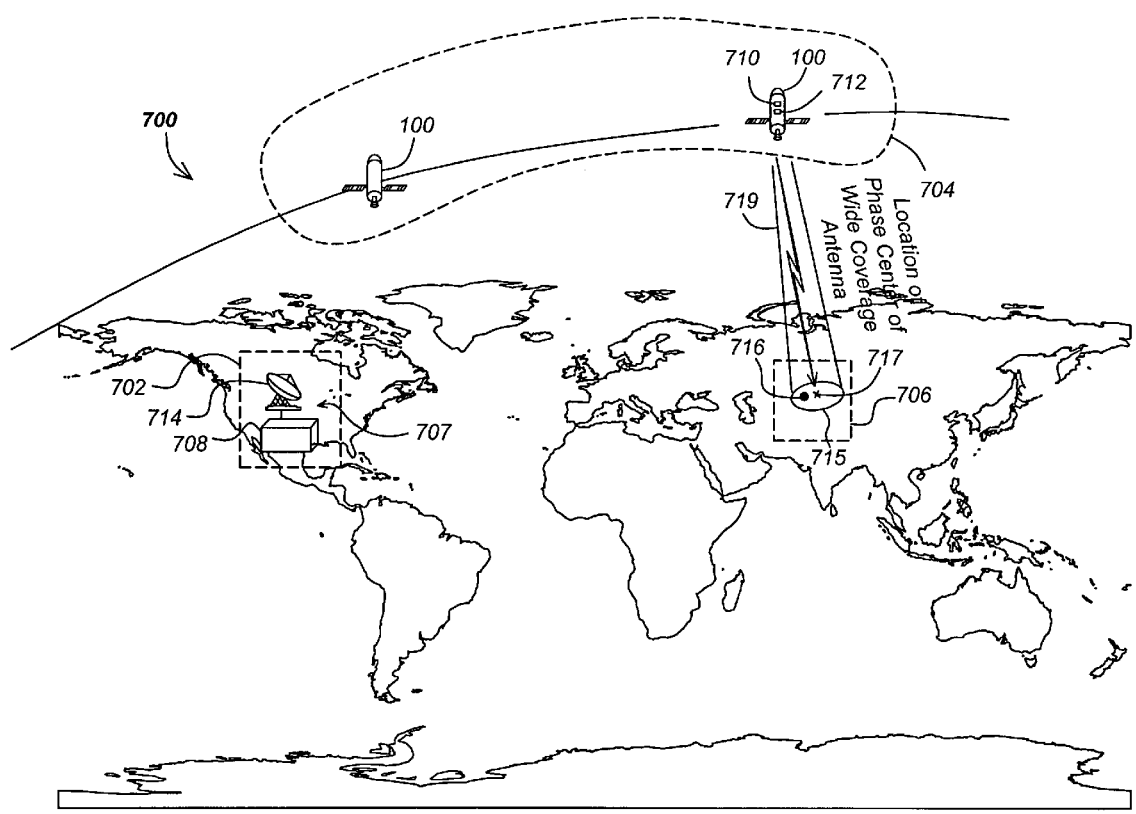
FIG. 7 is a diagram illustrating architectural elements of a space-based navigational system.

FIG. 7 is a diagram illustrating architectural elements of a space-based navigational system 700. The navigational system 700 comprises a space segment 704 having a plurality of navigational satellites 100 (hereinafter alternatively referred to as spacecraft) in orbit around the Earth. Each of the satellites 100 includes a first transmitter 710, which transmits a first navigational signal using the wide beam antenna 106E and a second transmitter 712, which, using the spot beam antenna 106S, transmits a spot beam 719 having a second navigational signal to one or more of the navigational receivers 716 that together form the user segment 706. The spot beam 719 covers an area 715 on the Earth's surface, and is centered on the target spot beam position 717. Both the first navigational signal and the second navigational signal include information that can be used to determine the location of the navigational receiver 716. In a jamming environment, a navigation receiver may lose lock on the first navigation signal and will not be able to produce any positional solution. The second navigational signal, however, is typically of greater power by virtue of being transmitted via a spot beam, and, will be used for positional determination using the navigational receiver 716 in the jamming environment. The satellites 100 in the space segment 704 are controlled via commands from the ground segment 702, which comprises one or more ground-based command stations 707, each including a command center 708 and a communicatively coupled antenna 714 for transmitting and receiving information and commands to and from the satellites 100 of the space segment 704.

The operations illustrated in FIG. 6 can be performed on-board the satellite 100, the ground segment 702 controlling the satellite 100, by the navigational receivers 716 making up the user segment 706, or any combination thereof.

However, while a fixed antenna lever arm 114 can be computed in the satellite coordinate frame 156 and transmitted to the GPS receiver in the navigational message assuming an idealized yaw steering profile, this technique has serious disadvantages. For example, this approach cannot be applied to GPS systems that use steerable spot beam antennas, because the GPS receivers do not know the satellite 100 attitude very accurately, and thus have insufficient information to compute an estimate of the lever arm 114 at all times. This solution also requires use of a significant portion of the transmission bandwidth and the navigation message. Also, because of satellite attitude control system 200 limitations, the high yaw rate maneuvers that occur at low Sun 306 angles (such as shown in FIG. 5) add substantial uncertainty to the antenna lever arm 114 corrections transmitted to the GPS receivers.

One solution to these problems is to compute discrete lever arm 114 corrections in the GPS coordinate frame in the satellite 100 and periodically transmit the corrections to the GPS receivers. Since the correction data is in the GPS coordinate frame, it can be applied to the satellite orbital motion data already provided by the GPS system, and thus requires only minimal GPS receiver processing. However, such discrete corrections do not provide solutions in between the discrete points, and adding discrete points would consume a prohibitively large portion of the transmission bandwidth in the navigation message.

Finally, a problem with either of the foregoing correction approaches is that the corrections must be extrapolated for some period into the future. The first approach (that of transmitting the fixed antenna lever arm position in the satellite 100 coordinate frame in the navigational message and relying upon the GPS receivers to use this information along with a satellite yaw steering maneuver to enable computation of the corrections in a GPS coordinate frame), relies on an idealized (and often inaccurate) prediction of the satellite 100 attitude for all relevant times. The second approach makes predictions at least 15 minutes into the future, and during those 15 minutes without additional information or constraints, this solution can yield large errors.

The present invention solves these problems without the need for the navigational satellites 100 to transmit any additional information, and can be implemented even though the satellite attitude and gimbal geometry are continuously changing. It also permits computation of a lever arm correction at any point in time, without relying on interpolation or curve fitting techniques.

Figure 8A:
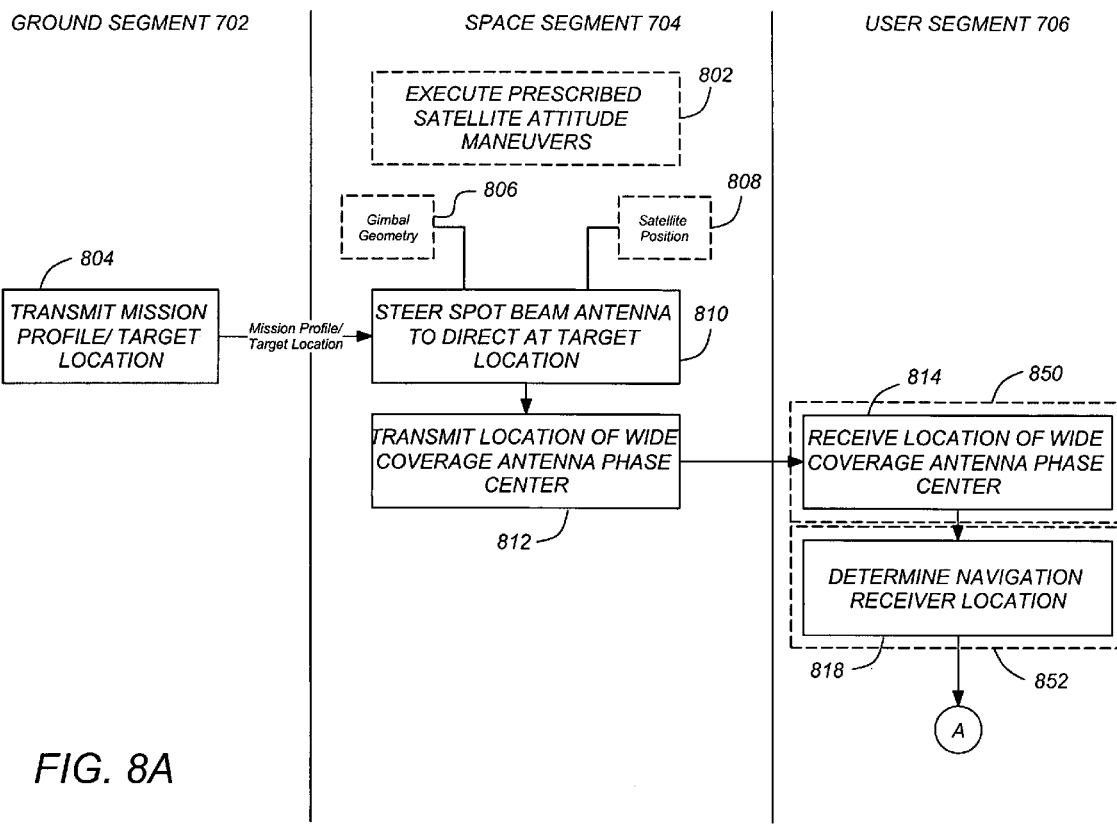
FIGS. 8A and 8B are diagrams illustrating exemplary process steps that can be used to implement one embodiment of the invention, and how these process steps can be allocated to the architectural elements.
Figure 8B:
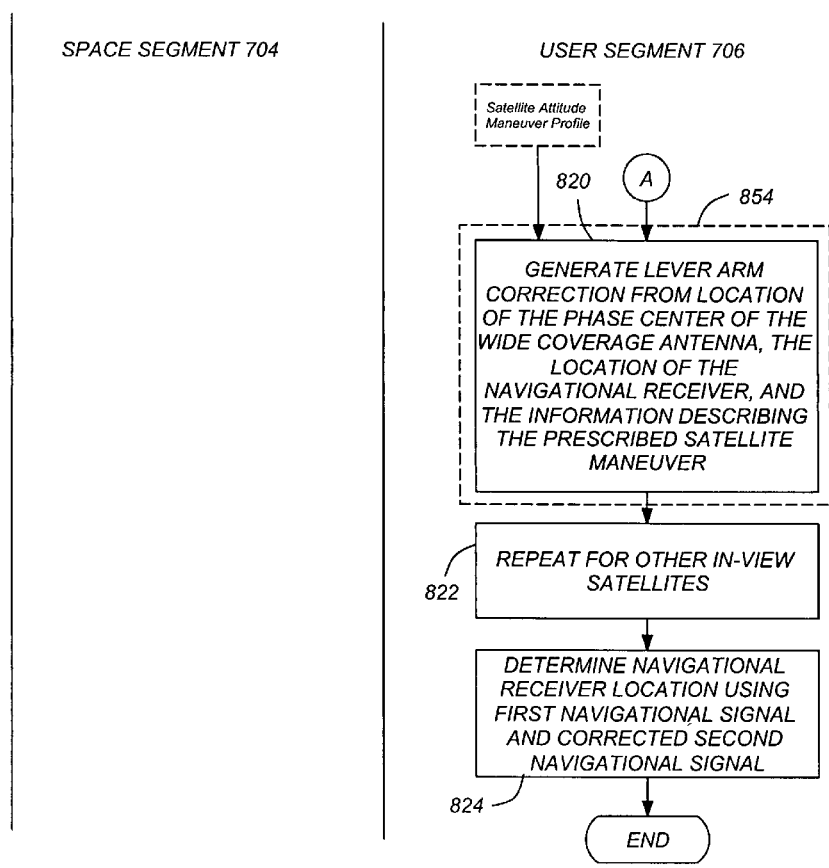

FIGS. 8A and 8B are diagrams illustrating exemplary process steps that can be used to compute the lever arm 114 correction. Referring first to FIG. 8A, each of the satellites 100 in the space segment 704 performs the prescribed satellite attitude maneuver when a satellite maneuver is required.

Figure 9:
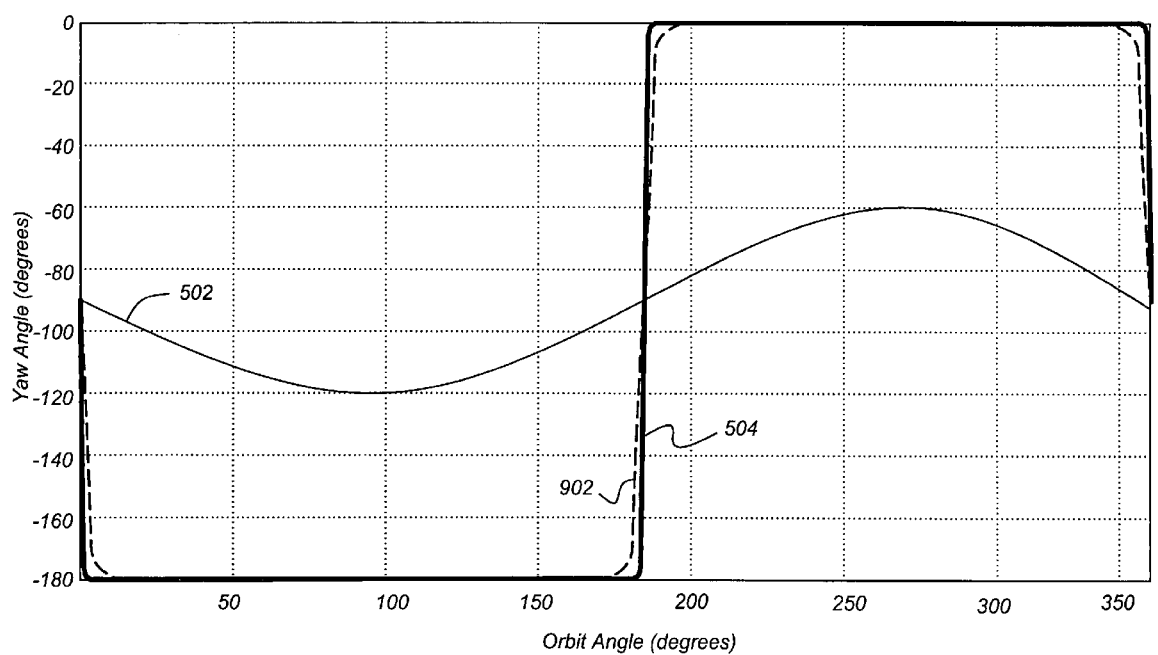
FIG. 9 is a plot of the yaw attitude angle of the satellite as a function of the orbit angle and the Sun angle for an exemplary prescribed satellite maneuver profile.

FIG. 9 is a plot of the yaw attitude angle of the satellite 100 as a function of the orbit angle 310 and the Sun 306 angle for an exemplary profile of a prescribed satellite 100 attitude maneuver. The prescribed attitude maneuver can be defined such that, when accounting for the capabilities and limitations of the satellite's attitude control system 200, the satellite can execute the prescribed attitude maneuver within a specific angular tolerance, the selection of such tolerance being a function of the desired lever arm estimation accuracy. In one embodiment, the value of this tolerance, expressed as a difference between the commanded satellite attitude and the actual satellite attitude, is less than 0.2 degrees.

As was true in FIG. 5, trace 502 illustrates yaw angle profile for a high Sun 306 angle $\theta$. At high Sun 306 angles $\theta$, the ideal required yaw rates and accelerations are relatively small. However, at low Sun 306 angles $\theta$ (e.g. Sun angles less than about 5 degrees), the ideal required yaw rates and/or accelerations are much higher, as shown in trace 504. These yaw rates are high enough so that the satellite's attitude control system 200 cannot follow the ideal profile, and thus, the deviation from the expected satellite 100 attitude angle and the actual satellite 100 attitude angle is significant enough to negatively impact the estimation of the lever arm 114. Also, the maneuver is initiated based upon sensor (e.g. Sun, Earth, and/or star sensors) measurements, hence the time the maneuver is initiated is another source of unpredictability. To prevent this, the satellite is commanded to perform a prescribed satellite maneuver 808.

This prescribed satellite attitude maneuver can be defined such that, when accounting for the capabilities and limitation of the satellite's attitude control system 200, the satellite 100 can execute the prescribed attitude maneuver to within specified tolerances. The maneuver profile can be arrived at by (1) limiting the satellite attitude angular rate and/or acceleration in all axes (e.g. pitch, roll, and yaw) or a single axis (e.g. yaw only) to a maximum value, (2) limiting the error between the predicted satellite attitude and the actual satellite attitude (when attitude control system 200 limitations are considered), (3) and/or placing other suitable restrictions upon the commanded satellite maneuver. For example, the prescribed satellite maneuver profile 808 can be defined so as to limit the error between the predicted satellite attitude and the actual satellite attitude to less than 0.2 degrees and/or limit the yaw attitude rate and acceleration to a particular value.

An exemplary profile is illustrated in FIG. 9 as trace 902. Note that the difference between the ideal maneuver (trace 504) and the prescribed maneuver (trace 902) is small enough so that the solar panels 104 remain adequately directed at the Sun, yet by commanding the satellite attitude control system 200 to perform the prescribed maneuver instead of the ideal maneuver, the resulting actual satellite 100 attitude becomes predictable enough to allow the lever arm to be accurately predicted. Also, exemplary profile 902 is described using relatively simple equations, which will not place significant stress on computer processors needed to compute them. A description of how a prescribed satellite maneuver and its related profile might be determined is described further below.

Returning to FIG. 8A, the ground segment 702 transmits a target location, mission profile (which may comprise an expected target location over time), or target spot beam pointing position (e.g. the location of the center of the spot beam on the Earth's surface) to the satellite 100, as shown in block 804. The satellite 100 then steers the spot beam antenna 106S to direct it at the desired location. To accomplish this, the satellite uses information describing the satellite's position 808 to determine the vector between the satellite 100 and the target and the gimbal geometry 806 to determine at which angle the gimbals 154 must be placed to direct the steerable spot beam antenna to the appropriate location.

Estimates of the satellite's position may be generated on-board the satellite 100 from on board sensor measurements, by the use of terrestrially-based beacons. The satellite's position may also be obtained or improved upon using data from surveillance systems such a terrestrially-based network such as the space surveillance network (SSN), or a space-based space surveillance network. Such data can be uplinked to the satellite 100 on a periodic, aperiodic, or continuous basis. In one embodiment, the satellite's position is determined using well known orbital equations, and is expressed via satellite ephemerides.

The gimbal geometry 806 (which reflects the dimensions and orientation of the gimbal structures and joints used to rotate the gimbals to direct the spot beam antenna 106S, or information describing the relationship between desired pointing directions and gimbal angles) can be pre-programmed into a memory of the satellites 100 of the space segment 704, but can also be uplinked to the space segment 704 from the ground segment, if desired. The gimbal geometry 806 can include, for example, a coordinate transformation from the wide coverage antenna phase center 112E to the coordinate reference frame of the satellite bus 156A, a coordinate transformation from the satellite bus reference frame 156A to a first gimbal coordinate reference frame 156B, a coordinate transformation from the first gimbal coordinate reference frame 156B to a second gimbal coordinate reference frame 156C, and a coordinate transformation from the second gimbal coordinate reference frame 156C to the phase center as defined in the steerable spot beam antenna reference frame 156D. The gimbal geometry 806 may also include the positional vectors from the wide coverage antenna phase center 114E to the each gimbal motor 154, and from the gimbal motors 154 to the steerable spot beam antenna phase center 114S, as well as the rotational axes of the gimbal motors. Preferably, this information would be in the satellite bus coordinate system 156A.

Returning again to FIG. 8A, the satellite 100 transmits the location of the wide coverage antenna phase center 112E to the navigational receivers 716 in the user segment 706, as shown in block 812. Since the yaw axis of the satellite 100 is always nominally directed at the Earth's center, the wide coverage antenna 106E and its phase center 112E do not change significantly with changes in the satellite's attitude. Consequently, the transmission of the location of the wide coverage antenna phase center can be accomplished by simply transmitting the location of the satellite itself to the navigational receiver 716 and assuming the satellite center of gravity is a fixed offset from the phase center. Alternatively, the navigation receiver 716 can do a simple coordinate transformation from the satellite bus coordinate reference frame 156A to the location of the wide coverage antenna 106E phase center using known information regarding the satellite's attitude derived from the satellite's orbit.

The location of the wide coverage antenna phase center 112E (or the satellite 100) may be transmitted in the first navigational signal transmitted by the wide coverage antenna 106E or the second navigational signal of the spot beam antenna 106S. For example, in this embodiment, the first navigational signal may include satellite ephemeris data. In block 814, the navigation receiver 716 of the user segment 706 receives the location of the wide coverage antenna phase center 112E. This can be accomplished by a receiver module 850 of the navigation receiver 716. The receiver module 850 is preferably the same module that is used to receive the first navigation signal, but this need not necessarily be the case. Further, the receiver module 850 may comprise electronic circuits, a processor performing software instructions stored in a communicatively coupled memory, or a combination of both.

Next, in block 818, the navigation receiver 716 determines its location. In a preferred embodiment, the navigation receiver 716 determines its location using a plurality of navigation signal(s) transmitted by the satellites 100 in the navigation system 700, as would be accomplished by a baseline navigation system such as GPS. Note that since the baseline navigation signal(s) provided by the wide coverage antenna 106E and the spot beam antenna 106S include satellite ephemeris data and together, can be used to determine the location of the navigation receiver 716, neither the satellites 100 in the space segment 704 nor the command stations 707 of the ground segment 702 need transmit anything to the navigation receivers 716 other than the information content of the first (or second) navigation signal that is ordinarily transmitted to them. The navigation receiver's location can be determined by a location module 852, which can be the same design location module that is used in well-known navigation systems such as GPS. As was true with the receiver module 850, the location module 852 may comprise electronic circuits, a processor performing software instructions stored in a communicatively coupled memory, or a combination of both.

Turning to FIG. 8B, the navigation receiver 716 then generates a lever arm 114 correction, as shown in block 820. This is accomplished using the location of the phase center of the wide coverage antenna 114E, the location of the navigational receiver 716, the same gimbal geometry as in 806, and the information describing the prescribed satellite 100 attitude maneuver profile. The prescribed satellite attitude maneuver profile can be pre-computed and stored in the navigation receiver 716, and may also be updated by transmission of data from the ground segment 702 or the space segment 704 as required.

The operations performed by block 820 can be performed within a lever arm correction module 854, which may comprise electronic circuits, a processor performing software instructions stored in a communicatively coupled memory, or a combination of both.

Finally, the operations shown in blocks 810–820 above are repeated for other satellites 100 that have a line-of-sight to the navigational receiver 716, and the navigational receiver location is determined using the first navigational signal and a lever arm corrected second navigational signal. This is shown in blocks 822 and 824.

Note that the computation of the lever arm correction ordinarily requires (1) knowledge of the satellite location, (2) the target location, and (3) the attitude of the satellite 100. With regard to (1), the navigation receiver 716 receives the satellite location in the basic navigational signal received from either antenna, 106E or 106S. With regard to (2), the navigational receiver 716 assumes that *it* is in the center of target area of interest when the navigational receiver 716 can receive the spot beam signal (since if it were not receiving the spot beam signal, a lever arm correction would not be required, as the steerable spot beam antenna 106S would not be directed at it) and hence, using signals from other satellites, can compute the target position. While the estimate using the navigational receiver's position is not as accurate (since the actual center of the spot beam target area is different from the receiver's measured position), these errors do not translate significantly to errors in the computation of the lever arm correction and subsequent more accurate computations of the navigation receiver's position. With regard to (3), the navigation receiver 716 can determine the attitude of the satellite 100 because it has been programmed with the profile of the prescribed maneuver 802 as a function of time, and the navigation solution from (1) also provides accurate time information. Further, because the satellite 100 attitude maneuver is prescribed to substantially reduce the difference between the ideal satellite 100 attitude maneuver and the maneuver that the satellite can actually perform (due primarily to limitations in the attitude control system), the navigation receiver 716 is capable of arriving at a substantially accurate estimate of the satellite attitude. Hence, the navigational receiver 716 can compute the lever arm correction using no more information that is ordinarily provided with a baseline (wide coverage) GPS signal, so long as the satellite 100 is constrained to perform the prescribed maneuver at the relevant times, and the navigation receiver 716 has knowledge of the prescribed maneuver. This permits the navigation receiver 716 to determine the lever arm correction substantially autonomously. Also note that the foregoing information (known satellite 100 motion, estimated target position, spot beam antenna 106S geometry, and the prescribed satellite 100 attitude maneuvers) can be provided in satellite bus 102 coordinates 156A, so that navigation receiver 716 can compute the lever arm directly in the same coordinates. Additional computation would allow the resulting vector to be expressed in any other coordinate system (e.g. Earth Centered Earth Fixed (ECEF)), if desired.

This results in significantly reduced errors in the navigation receiver's determination of its position. Specifically, this technique can improve errors by a factor of thirteen. This technique also allows a significant reduction of the complexity of the satellite's subsystems (because the satellite itself need not perform any additional computations, just transmit the usual navigation signals and perform the prescribed attitude maneuvers when called for). It also allows next-generation navigation receivers to be completely backwards compatible with existing navigation receivers 716.

Generation of Prescribed Maneuver Profile

Figure 10:
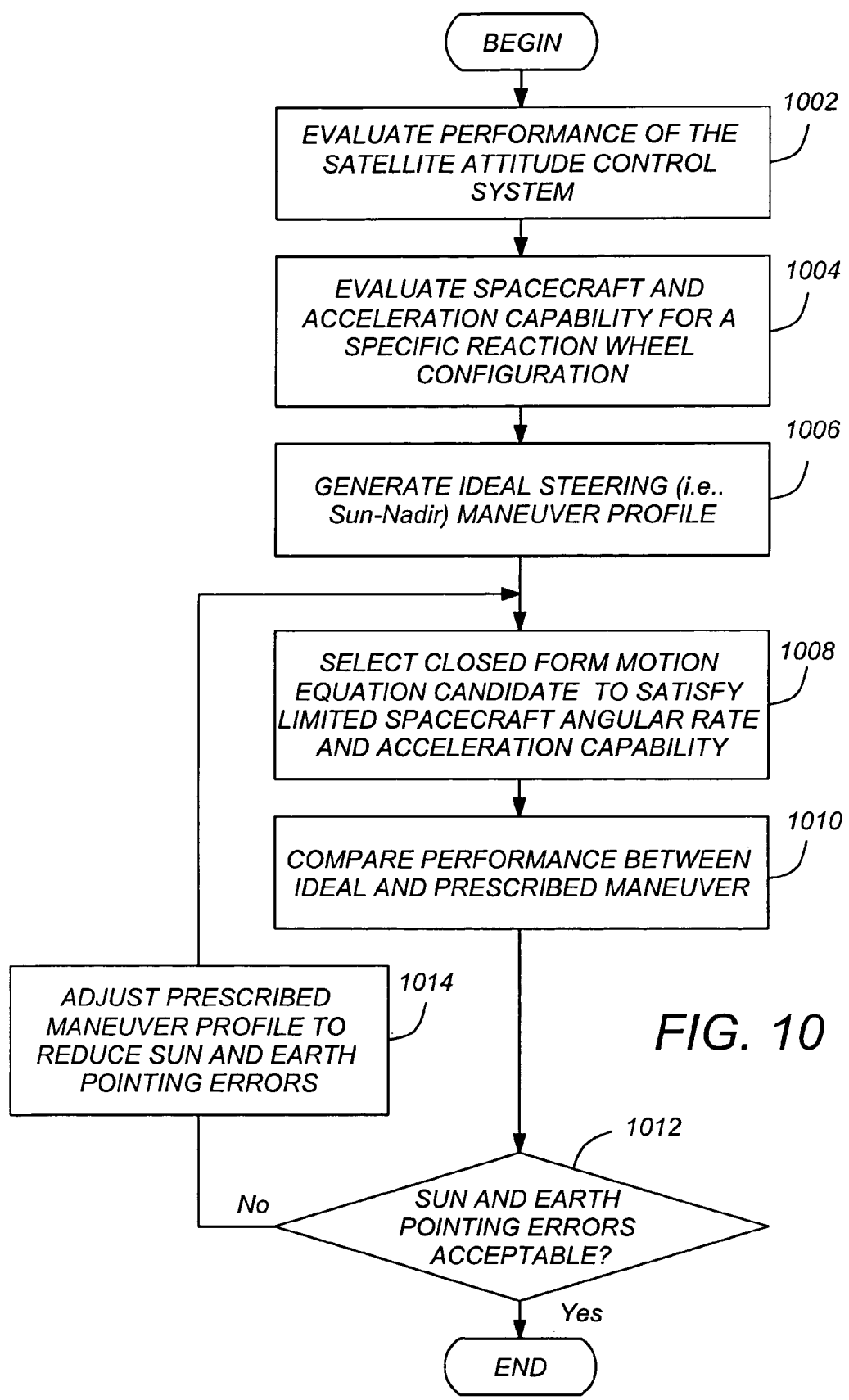
FIG. 10 is a diagram illustrating one technique that can be used to arrive at the prescribed maneuver profile.

FIG. 10 is a diagram illustrating one technique that can be used to arrive at the prescribed maneuver profile. In block 1002, the performance of the satellite attitude control system (ACS) is determined, using specifications and/or test data of the applicable components, including, for example, the reaction or momentum wheels, ACS thrusters, and attitude sensors. In block 1004, this data is used to determine the maximum angular rate and/or acceleration that can be achieved by the spacecraft 100 under the most demanding maneuvers it will be required to perform, typically the yaw maneuver at orbital noon and midnight for low Sun angles, as depicted in FIGS. 4A–4E. Since the yaw channel is typically most critical, a yaw steering profile can be examined. This can be accomplished using digital, analog, or hybrid control simulations of the satellite ACS 200. In block 1006, an ideal attitude profile is generated. This profile does not consider the limitations of the ACS 236, and yields zero pointing errors about all axes and zero pointing errors of the solar panels at all times. In block 1008, a candidate prescribed attitude profile is selected. The candidate profile is selected so as to attempt to match or closely approximate the ideal profile generated in block 1006. Preferably, the candidate attitude profile is computed using closed form equations with parametric variability. The candidate profile will generally deviate from the ideal profile by an error, and the goal is to minimize this error. Using this information, the candidate prescribed attitude profile is tested to determine if the spacecraft 100 can perform the maneuver described in the profile with sufficient (and typically nearly perfect) accuracy. Again, this can be performed with digital, analog, or hybrid simulations. If the test indicates that the satellite 100 can follow the prescribed maneuver profile. Alternatively if perhaps even better performance can be achieved by selecting a more demanding prescribed maneuver profile (using perhaps another candidate profile that follows the ideal profile more closely) that yields smaller errors when compared to the ideal profile, processing can return to block 1006 for the generation and eventual evaluation of that profile. If the test indicates that the satellite 100 cannot follow the prescribed maneuver profile, then the candidate prescribed maneuver profile is too demanding. The profile is adjusted in block 1014 and re-evaluated in steps 1008–1010. The foregoing process is iteratively repeated until a prescribed maneuver profile is found that achieves the least error between itself and the ideal maneuver profile, while still allowing the spacecraft to follow it essentially error free.

An example candidate prescribed yaw attitude profile is given below $$\psi_p = a\tan 2[-\sin(\beta_p), -\cos(\beta_p)\sin(\alpha)]$$

where $\psi_p$ is the prescribed yaw attitude (angle), $\alpha$ is the spacecraft orbit angle (i.e. its position), a tan2 is the two-argument arctangent function and $$\beta_p = \beta_a + \left(\frac{|\alpha| - \frac{\pi}{2}}{\frac{\pi}{2}}\right)^n [\text{sign}(\beta_n)\beta_{min} - \beta_a]$$

where $\beta_a$ is the actual current sun beta angle (i.e. the angle between the orbit plane and the sun), $\beta_{min}$ is a minimum sun beta angle below which the satellite cannot perfectly follow the ideal profile, and the orbit angle $\alpha$ is normalized ("unwrapped") so that its value always falls between $-\pi$ and $+\pi$. The exponent n is the parameter of the above equations, and it would be adjusted on each pass of the blocks 1008–1012 to achieve the best performance. Note that for this example there are some constraints on n, such as it must be even and positive. While other forms of the candidate profile may yield better performance, the above technique and candidate profile yields a value of n=10.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing discloses the use of hardware and/or software modules for performing particular processes and functions, the same functionality can be embodied in any number of hardware and/or software modules as well.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. In a system of navigational satellites, at least one of the navigational satellites having a wide coverage antenna transmitting a first navigation signal and a steerable spot beam antenna transmitting a second navigation signal, a method of estimating a lever arm correction between the wide coverage antenna and the spot beam antenna, comprising the steps of:
   receiving information describing a location of a phase center of the wide coverage antenna of the at least one navigational satellite in a navigational receiver;
   determining a location of the navigational receiver; and
   generating the lever arm correction from the location of the phase center of the wide coverage antenna of the at least one navigational satellite, the determined location of the navigational receiver, information describing a geometry of the steerable spot beam antenna, and a profile of a prescribed satellite attitude maneuver.

2. The method of claim 1, wherein the information describing the location of the phase center of the wide coverage antenna of the at least one navigational satellite includes an ephemeris of the at least one navigational satellite.

3. The method of claim 1, wherein the information describing the location of the phase center of the wide coverage antenna of the at least one navigational satellite is received along with the first navigational signal or the second navigational signal.

4. The method of claim 1, wherein the location of the navigational receiver is determined at least in part from the first navigational signal or the second navigational signal.

5. The method of claim 1, wherein the profile of the prescribed navigational satellite attitude maneuver is pre-stored in the navigational receiver.

6. The method of claim 1, wherein the profile of the prescribed navigational satellite attitude maneuver is transmitted to the navigational receiver.

7. The method of claim 1, wherein the profile of the prescribed navigational satellite attitude maneuver is generated from an angle between an orbital plane of the at least one navigational satellite and the Sun and information describing a location of the phase center of the wide angle coverage antenna.

8. The method of claim 1, wherein the prescribed navigational satellite attitude maneuver is constrained to limit the attitude angular rate of the navigational satellite to a maximum value.

9. A navigation receiver, comprising:
   a receiver module for receiving a first navigational signal and a second navigational signal from at least one of a system of navigational satellites, the first navigational signal transmitted from a wide coverage antenna and having information describing a location of a phase center of the wide coverage antenna, and the second navigational signal transmitted from a steerable spot beam antenna and also having information describing the location of the phase center of the wide coverage antenna;
   a locating module, for determining a location of the navigational receiver at least in part from the first or second navigational signal; and
   a lever arm correction module for generating a lever arm correction from the information describing the location of the phase center of the wide coverage antenna, the determined location of the navigational receiver, information describing a geometry of the steerable spot beam antenna, and a profile of a prescribed satellite attitude maneuver.

10. The apparatus of claim 9, wherein the information describing the location of the phase center of the wide coverage antenna of the at least one navigational satellite includes ephemerides of the at least one navigational satellite.

11. The apparatus of claim 10, wherein the information describing the location of the phase center of the wide coverage antenna of the at least one navigational satellite is received along with the second navigational signal transmitted via the spot beam antenna.

12. The apparatus of claim 10, wherein the information describing the location of the phase center of the wide coverage antenna of the at least one navigational satellite is received along with the first navigational signal transmitted via the wide coverage antenna.

13. The apparatus of claim 9, wherein the profile of the prescribed navigational satellite attitude is pre-stored in the navigational receiver before deployment.

14. The apparatus of claim 9, wherein the profile of the prescribed navigational satellite attitude maneuver is transmitted to the navigational receiver.

15. The apparatus of claim 9, wherein the profile of the prescribed navigational satellite attitude maneuver is generated from an angle between an orbital plane of the at least one navigational satellite and the Sun and the predicted position of the at least one satellite within the orbital plane.

16. The apparatus of claim 15, wherein the profile of the prescribed navigational satellite attitude maneuver is constrained to limit the attitude angular acceleration of the navigational satellite to a maximum value.

17. In a system of navigational satellites, at least one of the navigational satellites having a wide coverage antenna transmitting a first navigation signal and a steerable spot beam antenna transmitting a second navigation signal, an apparatus for estimating a lever arm correction between the wide coverage antenna and the spot beam antenna, comprising:
   means for receiving information describing a location of at least one of the navigational satellites in a navigational receiver;
   means for determining a location of the navigational receiver; and means for generating the lever arm correction from the location of the at least one navigational satellite, the determined location of the navigational receiver, information describing a geometry of the steerable spot beam antenna, and a profile of a prescribed satellite attitude maneuver.

18. The apparatus of claim 17, wherein the information describing the location of the at least one of the navigational satellites includes ephemerides of the at least one navigational satellite.

19. The apparatus of claim 17, wherein the location of the navigational receiver location is determined at least in part from the first navigational signal transmitted from the wide coverage antenna or the second navigational signal transmitted from the spot beam antenna.

20. The apparatus of claim 17, wherein the profile of prescribed navigational satellite attitude maneuver is constrained to limit the attitude rate of the navigational satellite to a maximum value.

* * * * *